United States Patent
Sekine et al.

[11] Patent Number: 5,997,829
[45] Date of Patent: Dec. 7, 1999

[54] ENVIRONMENT PURIFYING MATERIAL

[75] Inventors: Yoshika Sekine, Tsukuba; Kenji Tonoki, Yuki; Tatsuya Uchida, Shimodate; Yasuo Miyadera, Tsukuba; Hiroyuki Kawada, Yuki; Takayuki Senda, Shimodate, all of Japan

[73] Assignee: Hitachi Chemical Company, Ltd., Tokyo, Japan

[21] Appl. No.: 08/973,001

[22] PCT Filed: May 27, 1996

[86] PCT No.: PCT/JP96/01423

§ 371 Date: Nov. 26, 1997

§ 102(e) Date: Nov. 26, 1997

[87] PCT Pub. No.: WO96/37288

PCT Pub. Date: Nov. 28, 1996

[30] Foreign Application Priority Data

| May 26, 1995 | [JP] | Japan | 7-128101 |
| Jun. 14, 1995 | [JP] | Japan | 7-147342 |
| Nov. 27, 1995 | [JP] | Japan | 7-306975 |

[51] Int. Cl.⁶ .............. B01J 23/00; B01J 34/07
[52] U.S. Cl. .......... 423/210; 423/237; 423/230; 423/245.1; 423/219; 423/239.1; 423/247; 210/749; 502/300; 502/307; 502/312; 502/324; 502/325; 502/309; 502/335; 502/345; 502/402; 502/406; 502/416; 502/417; 502/507; 502/439; 502/527.14; 502/527.15
[58] Field of Search ............... 502/402, 507, 502/406, 416, 417, 428, 514, 439, 527, 527.14, 527.15, 527.2, 300, 307, 312, 325, 324, 331, 345, 335, 309; 423/210, 230, 237, 245.1, 247, 219, 239.1; 210/749

[56] References Cited

U.S. PATENT DOCUMENTS

| 4,665,050 | 5/1987 | Degen et al. | 502/402 |
| 5,541,147 | 7/1996 | Friedlander et al. | 502/100 |
| 5,662,872 | 9/1997 | Shimada et al. | 423/236 |
| 5,883,864 | 11/1998 | Miller et al. | 210/724 |

FOREIGN PATENT DOCUMENTS

| 3719233 A1 | 12/1988 | Germany. |
| 4344805 A1 | 7/1994 | Germany. |
| 48-7051 | 1/1973 | Japan. |

(List continued on next page.)

OTHER PUBLICATIONS

English Abstract For DE 37 19 233 A Published Dec. 1988.

*Primary Examiner*—Gary P. Straub
*Assistant Examiner*—Timothy C Vanoy

[57] ABSTRACT

The present invention is directed to a sheet-form environment purifying material comprising particles of metal and/or metal oxide consisting essentially of at least one member being selected from the group consisting of manganese, copper, zinc, iron, vanadium, nickel, titanium, palladium, platinum, manganese oxide, copper oxide, zinc oxide, iron oxide, vanadium oxide, nickel oxide, titanium oxide, palladium oxide, and platinum oxide, adsorbent particles consisting essentially of at least one member selected from the group consisting of activated carbon, zeolite, silica gel, sepiolite, activated alumina and activated clay, thermoplastic resin particles being selected from ultrahigh-molecular weight polyethylene, polyethylene, polycarbonate, polyamide acrylonitrile-butadiene-styrene resins, polyimide, polyvinyl chloride, cellulose acetate, polysulfone, polystyrene phthalate and polypropylene, and an air-permeable sheet of fibrous. The metal and/or metal oxide particles and the adsorbent particles are respectively bound to the thermoplastic resin particles while retaining their inherent surface areas and performances without being covered by the thermoplastic resin layers, and the thermoplastic resin particles are joined to the fibrous substrate. The present invention is also directed to a process for making the environment purifying material which comprises the steps of mixing all the particles and heating the mixture at a temperature not lower than the melting point of the thermoplastic resin and not higher than the thermal decomposition temperature thereof. The environment purifying material of the present invention is useful as deodorizers and harmful gas removers.

20 Claims, 4 Drawing Sheets

FOREIGN PATENT DOCUMENTS

| | | |
|---|---|---|
| 49-131972 | 12/1974 | Japan . |
| 50-30795 | 3/1975 | Japan . |
| 55-99317 | 7/1980 | Japan ................................. 423/230 |
| 56-155637 | 12/1981 | Japan . |
| 57-77627 | 5/1982 | Japan ................................. 423/210 |
| 59-225742 | 12/1984 | Japan ................................. 502/527.2 |
| 61-57240 | 3/1986 | Japan . |
| 61-119269 | 6/1986 | Japan . |
| 63-178849 | 7/1988 | Japan . |
| 1-151938 | 6/1989 | Japan . |
| 2-135141 | 5/1990 | Japan . |
| 4-156854 | 5/1992 | Japan . |
| 5-49850 | 3/1993 | Japan . |
| 2142913 | 1/1985 | United Kingdom ................. 210/749 |
| WO94/03270 | 12/1994 | WIPO . |

ENVIRONMENT PURIFYING MATERIAL

This application is a national stage filling under 35 U.S.C. §371 of PCT/JP96/01423 filed May 27, 1996.

TECHNICAL FIELD

This invention relates to an environment purifying material that adsorbs and decomposes harmful substances causing rank odors, pollution, turbidity and so forth, contained in air, water, soil and so forth, and with which the air, water, soil and so forth can be made pure.

TECHNICAL BACKGROUND

Methods by which harmful substances, rank odors and so forth, contained in gases such as air and exhaust gases are adsorbed and decomposed to make the gases pure are known to include a method in which they are caused to chemically react with chemicals such as acid, alkali and aluminum sulfate to remove them, a method in which they are adsorbed on adsorbents such as activated carbon and zeolite to remove them, a method in which they are masked with aromatics, and a method in which they are oxidized or burnt using catalytic particles of metals or metal oxides. Methods by which substances causing rank odors, pollution, turbidity and so forth, contained in water such as river water, pond water and waste water are adsorbed and decomposed to make the water pure are also known to include a method in which they are adsorbed on adsorbents such as activated carbon and zeolite, a method in which they are oxidized and decomposed using chemicals such as ozone, and a method in which they are decomposed by microorganisms.

As methods for producing porous structural materials containing adsorbent particles such as activated carbon and zeolite or particles of metals or metal oxides having a reactivity as catalyst (catalytic activity), the following methods are conventionally known.

One of them is a method in which particles such as particles of metals or metal oxides are mixed and the mixture is press-molded (a method called press molding). For example, Japanese Patent Application Laid-open (KOKAI) No. 50-30795 discloses a method in which 40 parts by weight of manganese dioxide, 20 parts by weight of cupric oxide and 40 parts by weight of gamma alumina are mixed and the mixture is formed into tablets.

Another method is a method in which a porous carrier or a porous structural material is impregnated with an aqueous solution of salts of metals such as manganese and copper, followed by baking (a method called baking or sintering). Materials used in such a method include, for example, a deodorizer comprising A-type zeolite incorporated with manganese oxide and copper oxide (Japanese Patent Application Laid-open (KOKAI) No. 1-151938), and a deodorizer comprising a honeycomb porous carrier supported with manganese dioxide and cupric oxide (Japanese Patent Application Laid-open (KOKAI) No. 4-156854).

Other methods are also known to include a method in which the adsorbent particles such as activated carbon and zeolite and/or particles of metals or metal oxides are mixed together with a binder and the mixture obtained is extruded by means of an extruder into stated shapes, followed by heating and activation to obtain porous particulate products (a method of extrusion molding with a binder), and a method in which the particles of metal oxides or the like are kneaded into a foamable thermoplastic resin, followed by heating to blow the resin into foams, which are used as deodorizing porous structural materials (a method of foaming), and so forth.

Methods for producing sheet-like deodorizers are also known to include a method in which a deodorizer powder and a thermoplastic resin powder are sprayed onto a substrate sheet made of paper or the like, followed by heating to bring them into an integral form (Japanese Patent Application Laid-open (KOKAI) No. 61-119269), and a method in which a mixture of a deodorizing powder for gas treatment and a thermoplastic resin powder is held between two layers of sheets at least one of which is an air-permeable sheet, followed by contact bonding to bring them into an integral form (Japanese Patent Application Laid-open (KOKAI) No. 5-49850), and so forth.

In the case when deodorizing porous structural materials are produced by the above pressure molding, the particles of metals or metal oxides are so closely packed that the molded products have a low specific surface area and a poor air permeability. There is another problem that particles that tend to collapse, as in the case of activated carbon and zeolite, cannot be molded.

In the case when they are produced by baking, there is a problem that oxide layers formed and impurities formed at the time of baking because of the binder used may block up the micropores of porous carriers, resulting in a decrease in specific surface area of the porous structural materials. In the case when they are produced by sintering, it is difficult to cause metal or metal oxide particles to join to the surface of activated carbon.

In the case when they are produced by extrusion molding with a binder or foaming, particles of the deodorizer powder are covered with the binder or the foamable resin, and hence odor components cannot come into direct contact with the deodorizer powder, to cause a problem that the performance inherent in the deodorizer powder cannot be exhibited.

DISCLOSURE OF THE INVENTION

An object of the present invention is to provide an environment purifying material comprising particles of a metal and/or a metal oxide, adsorbent particles, and thermoplastic resin particles, or an environment purifying material comprising these particles and an air-permeable sheet fibrous substrate, where the particles of a metal and a metal oxide and/or the adsorbent particles keep the original performance and specific surface area effectively retained, and are brought into an integral form as a porous structural material.

In an embodiment of the present invention, the environment purifying material comprises;

(a) particles of a metal and/or a metal oxide;
(b) adsorbent particles; and
(c) thermoplastic resin particles.

In this embodiment, the component-(a) particles of a metal and/or a metal oxide and the component-(b) particles of adsorbent particles respectively stand bound to the surfaces of the component-(c) thermoplastic resin particles at their mutual contact portions, and the component-(c) thermoplastic resin particles stand joined to each other at their contact portions. In this specification, semi-metals like silicon, are included in metals.

The environment purifying material of the present embodiment will be described below with reference to accompanying drawings. FIG. 1 diagrammatically illustrates an example of how the component-(a) to (c) particles stand bound or joined in the environment purifying material of the present invention, and FIG. 2 diagrammatically illustrates another example of how the particles (a) to (c) stand bound or joined in the environment purifying material of the present invention. In FIGS. 1 and 2, reference symbol a1 denotes metal oxide particles 1; a2, metal oxide particles 2; b, adsorbent particles; and c, thermoplastic resin particles. Two kinds of metal and/or metal oxide particles (a1 and a2) and one kind of adsorbent particles (b) stand bound to the surfaces of the thermoplastic resin particles (c) at their mutual contact portions while keeping their shapes (shown as spherical shapes in the drawings), and the particles of the thermoplastic resin particles stand joined to each other at their contact portions. Thus, a porous structural material having a three dimensional shape is formed.

In the environment purifying material of the present invention, materials having a specific surface area of 200 m$^2$/g or larger can also be obtained. Hence, the environment purifying material of the present invention has a high rate of contact with rank odors and harmful substances, and shows a good environment purifying performance.

The metal and/or metal oxide particles (a) include particles of manganese, copper, zinc, iron, vanadium, nickel, magnesium, aluminum, titanium, palladium, platinum, cerium or silicon, and oxides thereof.

Manganese oxides includes $MnO_2$, $MnO$, $Mn_3O_4$, $Mn_2O_3$ and $Mn_2O_7$ or the like. In particular, $MnO_2$ may preferably be used.

Copper oxides includes $CuO$, $Cu_2O$ and $Cu_4O$. In particular, $CuO$ may preferably be used.

Any of these metal and/or metal oxide particles may be used alone, or may be used in combination of two or more kinds so that the function to purify many kinds of harmful substances can be imparted. When two or more kinds of particles are used in combination, it is preferable to use a material containing, for example, manganese dioxide particles and cupric oxide particles. In such a case, manganese and copper may preferably be in a weight ratio of Mn/Cu of about 4:1 or so, or about 2:3 or so, in terms of element weight ratio. Their use in such a ratio enables effective removal of sulfur-containing odor gases.

The adsorbent particles (b) used in the present invention include particles of activated carbon, zeolite, silica gel, sepiolite, activated alumina and activated clay and so forth. Any of these adsorbent particles supported with aluminum sulfate, iodine, ferrous sulfide, calcium phosphate, sodium carbonate, magnesium silicate, boric acid, phosphoric acid, ascorbic acid, tartaric acid, oxalic acid, tannic acid, gallic acid or the like may also be used. Any of these adsorbent particles may used alone, or may be used in combination of two or more kinds.

The activated carbon includes vegetable carbonaceous materials made from a material such as coconut shells and almond shells, charcoal, and bituminous coal, as well as synthetic resin carbonaceous materials made from a material such as phenol resin, any of which may be used.

The thermoplastic resin particles (c) used in the present invention include particles selected from particles of ultrahigh-molecular weight polyethylene, polyethylene, polycarbonate, polyamide ABS (aerylonitrile-butadiene-styrene) resins, polyimide, polyvinyl chloride, polysulfone, polystyrene phthalate, polypropylene, and cellulose acetate or the like. The particles must have a melting point high enough to endure atmospheric temperatures of 70 to 100° C. in the summer season. These thermoplastic resin particles play a role as a binder that binds the metal and/or metal oxide particles (a) and the adsorbent particles (b) to the surfaces of the thermoplastic resin particles (c) at their mutual contact portions without being covered with thermoplastic resin layers. Also, the thermoplastic resin particles (c) stand joined to each other at their contact portions. Thus, as a whole, a porous structural material having a three dimensional shape is formed.

Of the various kinds of thermoplastic resin particles, ultrahigh-molecular weight polyethylene having an average molecular weight of from 1,000,000 to 9,000,000 as measured by viscometry may preferably be used, because they have less residual monomer components, a high stability to acid, alkali and organic chemicals, and also do not damage the surfaces of the metal and/or metal oxide particles (a) and adsorbent particles (b), making it possible to obtain a porous structural material having a superior environment purifying performance and an appropriate strength.

The metal and/or metal oxide particles (a) used in the present invention may preferably have a size of from 0.1 to 10 μm in terms of average particle diameter. If the particles have a size smaller than 0.1 μm, they may agglomerate to make it difficult to be uniformly dispersed. In a size larger than 10 μm, the particles may have a small specific surface area, resulting in a lowering of reactivity as catalyst.

The specific surface area of the metal and/or metal oxide particles (a) depends on the type of metal or metal oxide particles, the particle diameter thereof and the surface roughness.

The adsorbent particles (b) used in the present invention may have particles having such a size that they pass a sieve of 48 meshes (corresponding to particle diameter of 300 μm), and may preferably contain the particles with such a size in an amount not less than 50% by weight, and more preferably not less than 70% by weight, based on the total weight of the adsorbent particles (b). If the particles passing a sieve of 48 meshes are in an amount less than 50% by weight (in other words, if particles not passing a sieve of 48 meshes are in an amount more than 50% by weight), the particles may have a small specific surface area, resulting in a lowering of adsorptivity. The adsorbent particles (b) may preferably have a specific surface area of at least 350 m$^2$/g.

The thermoplastic resin particles (c) used in the present invention may preferably have a size of from 20 to 150 μm, and more preferably from 20 to 50 μm, in terms of average particle diameter. Thermoplastic resin particles having a size smaller than 20 μm can be produced with difficulty and are expensive. If the particles have a size larger than 150 μm, the structural material obtained tends to have a low strength.

Herein, the average particle diameter of the metal and/or metal oxide particles is in terms of a number-based average value.

The average particle diameter of the thermoplastic resin particles is in terms of a central value (50% value, $D_{50}$) of weight-based particle size distribution.

In comparison of relative size of the respective particles (a), (b) and (c), the metal and/or metal oxide particles (a) may preferably have an average particle diameter 0.01 to 0.5 times the average particle diameter of the thermoplastic resin particles (c), and the adsorbent particles (b) may preferably have an average particle diameter 0.01 to 2 times the average particle diameter of the thermoplastic resin particles (c). When such conditions are satisfied, the surface area of the metal and/or metal oxide particles and that of the adsorbent particles can be effectively retained, promising a high grade of environment purifying performance such as reactivity as catalyst and adsorptivity, and making it possible to obtain an environment purifying material with a porous structure from which the respective component-(a) to (c) particles do not easily come off.

The thermoplastic resin particles (c) may be used in an amount of from 10 to 80 parts by weight, and preferably from 20 to 50 parts by weight, based on 100 parts by weight as the total weight of the metal and/or metal oxide particles (a) and adsorbent particles (b). If in an amount less than 10 parts by weight, the binding force of the metal and/or metal oxide particles (a) and the adsorbent particles (b) onto the thermoplastic resin particles (c) or the structure strength tends to be insufficient. If in an amount more than 80 parts by weight, environment purifying performance per unit weight tends to lower, and also such an amount cannot be said to be economical.

The environment purifying material described above can be produced by mixing;

(a) the particles of a metal and/or a metal oxide;

(b) the adsorbent particles; and (c) the thermoplastic resin particles;

and heating the mixture at a temperature not lower than the melting point of the thermoplastic resin (particles) used and not higher than the thermal decomposition temperature thereof. If necessary, an appropriate pressure may be applied to the mixture when heated.

The mixture may be heated at a temperature a lot lower than melting point of the thermoplastic resin up to a temperature not higher than its thermal decomposition temperature, and preferably at a temperature not lower than the melting point of the thermoplastic resin up to a temperature of the melting point plus 50° C. or below. In the case when the ultrahigh-molecular weight polyethylene is used as the thermoplastic resin particles, the mixture may be heated at a temperature of from 130° C. to 200° C., and preferably from 160° C. to 180° C. If heated at a temperature lower than 130° C., the binding of the metal and/or metal oxide particles (a) and adsorbent particles (b) to the ultrahigh-molecular weight polyethylene particles may be insufficient, tending to result in an unsatisfactory strength of the porous structural material obtained. If heated at a temperature higher than 200° C., the ultrahigh-molecular weight polyethylene particles may melt, and the molten matter may cover the surfaces of the metal and/or metal oxide particles and adsorbent particles, resulting in a lowering of environment purifying performance.

In the case when pressure is applied at the time of heating, the pressure may preferably be in the range of from 490 to 2,940 kPa (5 to 30 kg/cm$^2$), and more preferably from 490 to 2,450 kPa (5 to 25 kg/cm$^2$). If the pressure is higher than 2,940 kPa (30 kg/cm$^2$), the thermoplastic resin particles such as ultrahigh-molecular weight polyethylene particles may crush, making it difficult to achieve the desired air-permeability.

The heating (or heating and pressing) may be carried out for a time that is sufficient for the surface layers of the thermoplastic resin particles to become soft while keeping their spherical shape, until the particles have a binding power. It is important not to over-heat the thermoplastic resin so as not to melt and turn into liquid. Also, the heating time should be selected so that the respective particles of the metal and/or metal oxide particles and adsorbent particles can effectively keep their surface area. In the case when the ultrahigh-molecular weight polyethylene particles are used as the thermoplastic resin particles, the heating time may usually be in the range of from 5 to 60 minutes.

The structural material formed by heating (or heating and pressing) may have any form of various types such as grains, pellets, balls, tablets and sheets or plates under, etc. appropriate selection of the shapes of frames or the like.

The present invention further relates to the environment purifying material which is a sheet-form environment purifying material which comprises;

(a) particles of a metal and/or a metal oxide;

(b) adsorbent particles;

(c) thermoplastic resin particles; and (d) an air-permeable sheet of fibrous substrate;

the component-(a) particles of a metal and/or a metal oxide and the component-(b) adsorbent particles standing bound to the E surfaces of the component-(c) thermoplastic resin particles at their mutual contact portions; and the component-(c) particles standing joined to the component-(d) air-permeable sheet of fibrous substrate.

The environment purifying material of the present embodiment will be described below with reference to the figure. FIG. 3 diagrammatically illustrates how metal and/or metal oxide particles (a1, a2), adsorbent particles (b), thermoplastic resin particles (c) and a fibrous substrate (d) stand bound or joined in the environment purifying material of the present invention. In the figure, reference symbol al denotes metal oxide particles 1 (e.g., manganese dioxide); a2, metal oxide particles 2 (e.g., cupric oxide); b, adsorbent particles (e.g., activated carbon); c, thermoplastic resin particles; and d, fibers of the fibrous substrate. Two kinds of metal and/or metal oxide particles (a1 and a2) and one kind of adsorbent particles (b) stand bound to the surfaces of the thermoplastic resin particles (c) at their mutual contact portions while keeping their shapes (shown as spherical shapes in the drawing), and the particles of the thermoplastic resin particles stand joined to each other at their contact portions and also stand joined to the fibers of the fibrous substrate (d). Thus, these form a porous structural material having a three dimensional shape.

In the sheet-form environment purifying material of the present embodiment, the metal and/or metal oxide particles (a), the adsorbent particles (b) and the thermoplastic resin particles (c) have the same type and absolute or relative size as those previously described.

In the sheet-form environment purifying material of the present invention, it can have a specific surface area of 20 m$^2$/g or larger in usual cases and a much larger specific surface area of 30 m$^2$/g or larger in some cases, have a void volume of 50% or more in usual cases and a much larger void volume of 80% or more in some cases. Hence, the environment purifying material of the present invention can remove rank odors and harmful substances with good efficiency, has a high air-permeability, and exhibits a good environment purifying performance.

The air-permeable sheet fibrous substrate (d) may be a fibrous substrate having a void volume of from 60% to 99%, and preferably from 70% to 98%, including, for example, woven or nonwoven glass fabric, and woven or nonwoven plastic fabric made of polyethylene, polypropylene, polyamide or polyester, and paper or the like. In particular, nonwoven glass fabric basically made of glass fiber and having a void volume of from 70% to 98% may preferably be used in view of thermal resistance and air-permeability.

The fibrous substrate used may have any thickness without any particular limitations so long as it has a thickness large enough not to break when treated by impregnation or the like. When substrates having a large thickness are used, plate-form porous structural materials can be obtained. When those having a small thickness are used, sheet-form porous structural materials can be obtained.

The metal and/or metal oxide particles (a), adsorbent particles (b) and thermoplastic resin particles (c) held on the air-permeable sheet fibrous substrate (d) may be in a total weight, i.e., weight of (a)+(b)+(c), of from 40 to 200 parts by weight, and preferably from 70 to 150 parts by weight, based on 100 parts by weight of the air-permeable sheet fibrous substrate (d). If held in an amount less than 40 parts by weight, the environment purifying performance may lower. Also, it is difficult for them to be held thereon in an amount more than 200 parts by weight.

The above sheet-form environment purifying material can be produced by mixing;

(a) the particles of a metal and/or a metal oxide;

(b) the adsorbent particles;

(c) the thermoplastic resin particles;

(e) a water-absorptive resin; and (f) water;

to prepare a homogeneously dispersed suspension, and bringing the suspension into contact with an air-permeable sheet of fibrous substrate (d) in a stated quantity so as to be held thereon, followed by heating at a temperature not lower than the melting point of the thermoplastic resin and not higher than the thermal decomposition temperature thereof, to cause the metal and/or metal oxide particles (a) and the adsorbent particles (b) to join to the fibrous substrate (d) via the thermoplastic resin particles (c) while removing water content.

Here, the water-absorptive resin (e) is added in order to homogeneously disperse the aqueous suspension of the mixed particles of the metal and/or metal oxide particles (a), adsorbent particles (b) and thermoplastic resin particles (c). Upon addition of the water-absorptive resin, the water-absorptive resin absorbs water to cause an increase in viscosity, and the suspension of the mixed particles is brought into a state of homogeneous dispersion and besides the state of homogeneous dispersion is stably maintained for a long time. Hence, the subsequent step, i.e., the step of bringing the suspension into contact with an air-permeable sheet fibrous substrate in a stated quantity so as to be held thereon, can be carried out with ease.

The water-absorptive resin (e) may preferably be resins capable of absorbing water in a weight tens to thousands of times its own weight, including acrylic acid-vinyl acetate copolymer saponified products, polyvinyl alcohol cross-linked polymers, polyacrylonitrile polymer saponified products, polyacrylate cross-linked polymers, a starch-acrylonitrile graft copolymer, a starch-acrylate graft copolymer, a starch-vinylsulfonic acid graft copolymer, a starch-styrenesulfonic acid graft copolymer, a cellulose-acrylonitrile graft copolymer, a cellulose-styrenesulfonic acid graft copolymer, carboxymethyl cellulose cross-linked polymers, polyethylene glycol diacrylate crosslinked polymers, and polyvinyl pyrrolidone cross-linked polymers or the like.

Such water-absorptive resins are used for the purpose of dispersing and suspending the mixture of several kinds of particles homogeneously and also for a long time as described above, but have no positive role after the final porous structural material has been formed. Hence, the water-absorptive resin may preferably be a resin that can increase the viscosity of the suspension even when used in a small quantity and does not inhibit the function of the metal and/or metal oxide particles (a) or the adsorbent particles (b) after drying (dehydration). Highly water-absorptive resins are suited for such a purpose. Of the water-absorptive resins listed above, highly water-absorptive resins are acrylic acid-vinyl acetate copolymer saponified products, polyacrylate cross-linked polymers, a starch-acrylonitrile graft copolymer, a starch-acrylate graft copolymer, a starch-vinylsulfonic acid graft copolymer and a starch-styrenesulfonic acid graft copolymer or the like, and these are particularly preferably used.

The amount of the water-absorptive resin used may vary depending on the types of the water-absorptive resin. The amount may be determined appropriately according to the types. In such a case, the property serving as an index that determines the amount of the water-absorptive resin used is the viscosity of the suspension of the mixed particles. Accordingly, the water-absorptive resin may be used in an amount previously determined so as to provide a viscosity of from 10 to 500 cp, and preferably from 50 to 200 cp, as measured at 25° C., Usually, it may be used in an amount of approximately from 0.01 to 1.0 part by weight based on 100 parts by weight of the water.

The reasons why the water is used as a solvent are that it can maintain the properties of the respective particles, that it causes no environmental pollution, that it has a high safety in view of the prevention of fires on account of static electricity, and so forth.

The homogeneously dispersed suspension comprising a mixture of the metal and/or metal oxide particles (a), the adsorbent particles (b), the thermoplastic resin particles (c), the water-absorptive resin (e) and the water (f) can be prepared by, for example, a method in which the water-absorptive resin and water are mixed, followed by stirring during which the component-(a), (b) and (c) particles are added little by little, or a method in which the component-(a), (b) and (c) particles are added little by little in the water with stirring and then the water-absorptive resin (e) is added thereto. Methods are by no means limited to these.

As a method by which the aqueous suspension of the components (a), (b), (c) and (e) are held on the air-permeable sheet of fibrous substrate (d) in a stated quantity, the suspension may be coated or held on the fibrous substrate by using a conventional coating process such as dip coating, gravure coating or die head coating. Temperature may be set at room temperature.

After a stated quantity of the suspension has been held on the fibrous substrate, this substrate with the suspension is heated for a stated time at a temperature not lower than the melting point of the thermoplastic resin used and not higher than the thermal decomposition temperature thereof, more preferably, a temperature not lower than the melting point of the thermoplastic resin used and up to a temperature of the melting point plus 50° C. or below of the thermoplastic resin. As a result of this heating, the water content is evaporated and removed, so that the thermoplastic resin particles become soft at their surface layers to have a binding power. The thermoplastic resin particles having become soft at their surface layers so as to have a binding power, capture and bind on their surfaces the particles (a) and (b) while keeping their spherical particle shape, and the thermoplastic resin particles (c) join to the fibrous substrate while joining to each other at their contact portions.

The heating may be carried out for a time that is sufficient for the surface layers of the thermoplastic resin particles to become soft while keeping their spherical shape, until the particles have a binding power. The time may be previously fixed after experiments or the like. It is important not to over-heat the thermoplastic resin so as not to melt and turn liquid. In the case when the thermoplastic resin particles used are the ultrahigh-molecular weight polyethylene particles, the heating may usually be carried at a temperature of from 130 to 200° C., and preferably from 140 to 180° C.

The sheet-form environment purifying material described above may be superposed a number of times, followed by heating and pressing to produce a multi-layer sheet-form environment purifying material. Conditions for the heating and pressing may vary depending on the thermoplastic resin used. When the ultrahigh-molecular weight polyethylene is used, the heating and pressing may be carried out at 130 to 200° C., at 490 to 4,900 kPa (5 to 50 kg/cm$^2$) and for 5 to 120 minutes, and preferably at 140 to 170° C., at 980 to 2,940 kPa (10 to 30 kg/cm$^2$) and for 10 to 60 minutes.

The multi-layer sheet-form environment purifying material may be used in such a form that at least two layers of the layers constituting the environment purifying material respectively contain the metal and/or metal oxide particles (a) or adsorbent particles (b) of different types. For example, it is possible regard to a layer 1, that manganese dioxide particles are used as the particles (a) ((b), activated carbon particles; (c), ultrahigh-molecular weight polyethylene particles; and (d), nonwoven glass fabric), and with regard to a layer 2, cupric oxide particles are used as the particles (a) ((b), activated carbon particles; (c), ultrahigh-molecular weight polyethylene particles; and (d), nonwoven glass fabric).

The present invention is also concerned with a sheet-form environment purifying material provided with a protective layer, according to which at least one side of the sheet-form environment purifying material or multi-layer sheet-form environment purifying material is covered with an air-permeable surface protective material.

The air-permeable surface protective material is laminated so that even a small quantity of particles can be prevented from coming off from the sheet-form environment purifying material or laminated sheet-form environment purifying material.

The air-permeable surface protective material may be a sheet having an air-permeability and have meshes substantially fine enough not to pass the particles of the metal and/or metal oxide particles, adsorbent particles and so forth, and there are no particular limitations thereon. Such air-permeable surface protective materials include, for example, paper, nonwoven fabric and woven fabric or the like. The paper includes pulp paper, synthetic paper and filter paper or the like. The nonwoven fabric includes nonwoven single-material fabric made of polyethylene, polypropylene, polyamide or polyester, or mixed nonwoven fabric of some of these, and nonwoven glass fabric or the like. The woven fabric includes those made of natural or synthetic fiber such as cotton or polyester fiber etc.

The sheet-form environment purifying material with the surface protective material can be produced by superposing the air-permeable surface protective material on one side or both sides of the sheet-form environment purifying material or laminated sheet-form environment purifying material, followed by heating and pressing. Conditions for the heating and pressing carried out in this instance may vary depending on the thermoplastic resin used in the production of the sheet-form environment purifying material. When the ultrahigh-molecular weight polyethylene is used, the heating and pressing may be carried out at 130 to 200° C., at 490 to 4,900 kPa (5 to 50 kg/cm$^2$) and for 5 to 120 minutes, and preferably at 140 to 170° C., at 980 to 2,940 kPa (10 to 30 kg/cm$^2$) and for 10 to 60 minutes.

The present invention is also concerned with a environment purifying material having a honeycomb structure obtained by three-dimensionally working the sheet-form environment purifying material.

There are no particular limitations on the method for producing, from the sheet, the environment purifying material having a honeycomb structure. For example, it can be produced by the following methods.

Method 1

Using a corrugated board manufacturing machine, two sheets of the sheet-form environment purifying materials are joined together on one side as shown in FIG. 6A. As a binder between the two, the thermoplastic resin particles (e.g., ultrahigh-molecular weight polyethylene) in the sheet-form environment purifying material are utilized. Conditions for the heating and pressing vary depending on the thermoplastic resin used. When the ultrahigh-molecular weight polyethylene is used, the heating and pressing may be carried out approximately at 150 to 200° C., at 490 to 2,940 kPa (5 to 30 kg/cm$^2$) and for 2 to 10 minutes at a feed rate of 2 to 5 m/min. Products thus obtained are superposed in multiple layers as shown in FIG. 6B, followed by heating and pressing again. The heating and pressing at this stage may be carried out at 130 to 200° C., at 490 to 4,900 kPa (5 to 50 kg/cm$^2$) and for 5 to 120 minutes, and preferably at 140 to 170 ° C., at 980 to 2,940 kPa (10 to 30 kg/cm$^2$) and for 10 to 60 minutes.

Method 2

The sheet-form environment purifying material is cut into sheets with a given size, and the cut sheets are superposed in multiple layers. Spacers such as sheets of paper are inserted between the cut sheet-form environment purifying materials as shown in FIG. 7, followed by pressing from the top and bottom while heating. As to conditions for the heating and pressing, when the ultrahigh-molecular weight polyethylene is used, the heating and pressing may be carried out at 130 to 200° C., at 490 to 4,900 kPa (5 to 50 kg/cm$^2$) and for 5 to 120 minutes, and preferably at 140 to 170° C., at 980 to 2,940 kPa (10 to 30 kg/cm$^2$) and for 10 to 60 minutes.

The ultrahigh-molecular weight polyethylene, one of thermoplastic resins, has superior wear resistance, impact resistance, self-lubricating properties and chemical resistance. It also generates static electricity, and has the action of gathering particles of metal oxides or particles of activated carbon to its surface on account of its electrostatic force. Upon , the heating of particles of metal and/or metal oxides such as manganese dioxide and cupric oxide, or mixtures of adsorbent particles such as activated carbon with ultrahigh-molecular weight polyethylene particles, at a temperature of 130° C. to 200° C., the surfaces of ultrahigh-molecular weight polyethylene particles begin to become soft and have a binding power, so that the metal and/or metal oxide particles and the adsorbent particles adhere to the surfaces. Also, the ultrahigh-molecular weight polyethylene particles are joined to each other, so that the mass of particles expands three dimensionally (see FIG. 1, FIG. 2). Here, when pressed, the power to join particles to particles can be strengthened. Also, when frames or the like of various shapes are used, the products can be formed into various kinds of shapes. The temperature and pressure are the restored to ordinary temperature and ordinary pressure, whereupon a porous structural material having an appropriate rigidity can be obtained, that is, an environment purifying material in which the properties and surface area of the respective metal and/or metal oxide particles and adsorbent particles are effectively retained.

When, in addition to the particles described above, the water-absorptive resin capable of homogeneously dispersing the particles in the water in which the particles are suspended is used, it is possible to obtain the porous structural material in which the metal and/or metal oxide particles and the adsorbent particles are entangled with the air-permeable surface protective material via the thermoplastic resin particles, i.e., the sheet-form environment purifying material. In this sheet-form environment purifying material, too, the performances and surface area inherent in the metal and/or metal oxide particles and adsorbent particles are retained, resulting in a good environment purifying material.

Further, according to the present invention, there is provided a method of purifying the environment with removing pollutive substances contained in objects to be purified, by contacting the objects with the environment purifying materials of the present invention. Here, the pollutive substance means substances causative of rank odors, pollution, turbidity and so forth, and the object to be purified a liquid such as industrial waste water, a gas such as exhaust gas or air, or a solid such as soil.

As described above, the environment purifying materials of the present invention (any of those formed into grains, pellets, balls, plates, sheets or honeycomb structures) are porous structural materials, and the respective constituent particles effectively retain the properties and specific surface area inherent in the original particles, and can be high in performances characteristics such as adsorption performance and catalytic reactivities.

The environment purifying materials of the present invention can be utilized as materials for deodorizing smelly gases such as ammonia, hydrogen sulfide and mercaptan etc. present in the air, materials for removing or decomposing harmful gases such as ozone, nitrogen oxide and CO etc., materials for decomposing and removing CO, nitrogen oxide and so forth in tunnels or filters of air cleaners, and purifying materials for removing $NH_3$, P and so forth in water, as well as materials for deodorizing, adsorbing and decomposing various harmful substances having caused pollution of soil.

The environment purifying materials of the present invention have an appropriate strength, so that the particles do not easily come away from the structural materials, causing no environmental pollution by themselves. When touched, they do not contaminate hands. They are friendly to the global environment, and are safe.

Deodorizers making use of the environment purifying material of the present invention not only have a high deodorizing effect against sulfur type smelly gases, but also have a high deodorizing effect against nitrogen type smelly gases such as ammonia and trimethylamine.

Deodorizers making use of the environment purifying material of the present invention are compact, and have a long lifetime.

The production processes of the present invention enable easy manufacture of various types of environment purifying materials without the need to select any special fibrous substrates.

BRIEF DESCRIPTION OF THE DRAWINGS

FIG. 6A is a view where two sheet-like environment purifying materials are put together using a corrugated board manufacturing machine. FIG. 6B is a view where the materials shown in FIG. 6A are put together in four layers.

MOST PREFERRED EMBODIMENT OF THE INVENTION

An experimental example will be shown first, concerning the relationship between the mixing ratio of manganese dioxide and cupric oxide, and the deodorizing ability.

Experimental Example

Figure 5:
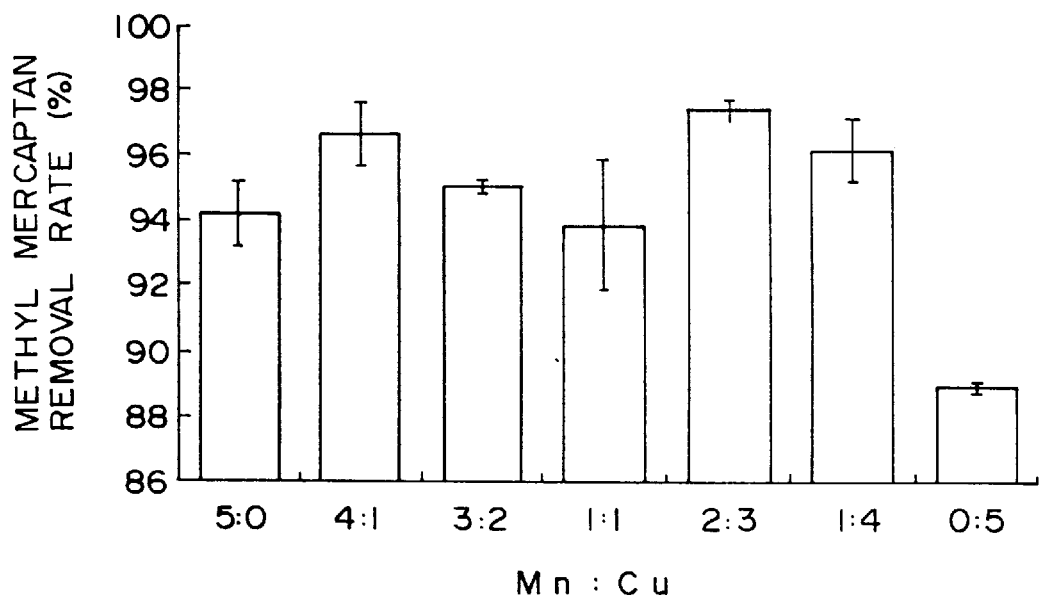
FIG. 5 is a graph showing the relationship between weight ratio of elements (Mn:Cu) in a powdery mixture of manganese dioxide and cupric oxide, and removal rate of methyl mercaptan.
Figure 7:
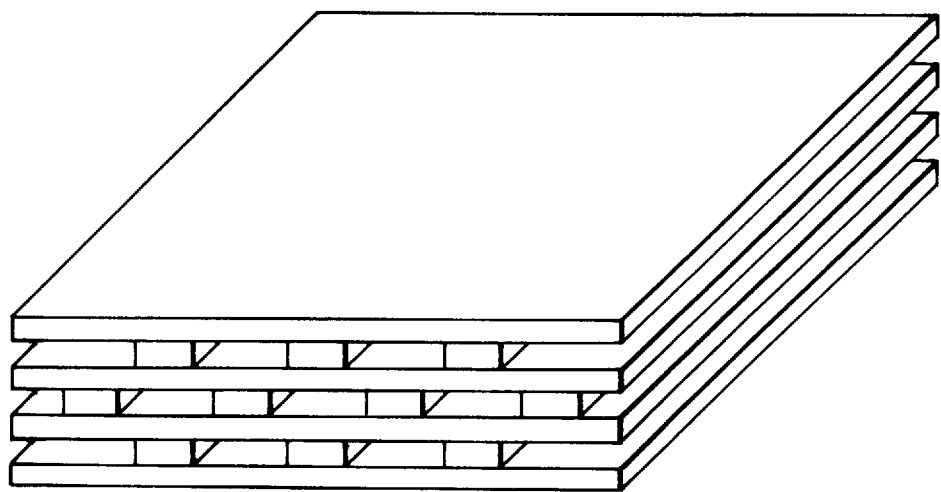
FIG. 7 is a diagrammatic cross-sectional view showing another example of the honeycomb structure.
Figure 6A:
FIGS. 6A and 6B are diagrammatic cross-sectional views showing examples of an environment purifying material with a honeycomb structure according to the present invention.
Figure 6B:
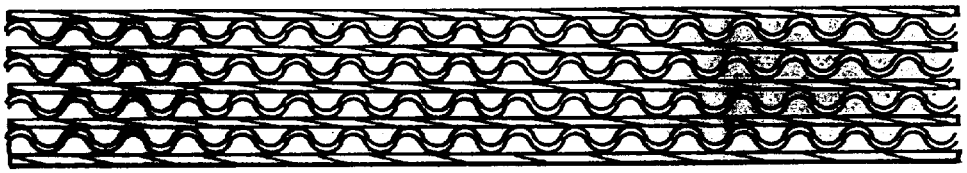

Manganese dioxide and cupric oxide were mixed in a weight ratio of elements (Mn:Cu), of 5:0, 4:1, 3:1, 1:1, 2:3, 1:4 or 0:5. The mixture obtained was blended using a ball mill made of agate to form a deodorizing metal oxide powdery mixture. This deodorizing metal oxide powdery mixture was observed with a microscope to examine its particle diameters, to find that it was a fine powder with particle diameters of about 5 $\mu$m or smaller. In a hermetically enclosed 1 liter beaker made of polypropylene, 10 $\mu$l of an aqueous 25% methyl mercaptan sodium salt solution was taken at room temperature, the methyl mercaptan being a rank-odor source. To this solution, 2 g of the above deodorizing metal oxide powdery mixture was added or not added. For both the cases, methyl mercaptan concentration was measured after minutes to make a comparison. The concentration was measured using an indicator tube. Results obtained are shown in FIG. 5. The abscissa indicates element weight ratio of manganese to copper in the powdery mixture, and the ordinate, methyl mercaptan removal rate.

As can be seen from FIG. 5, the methyl mercaptan removal rate and the Mn:Cu ratio are in the relationship of a double-peak fashion, showing maximum values when Mn:Cu is 4:1 and 2:3.

The present invention will be described below in greater detail by giving Examples. In the following Examples, the average particle diameter of the metal and/or metal oxide particles was measured using Model LMS-24 (manufactured by Seishin Kigyo K.K.), a device for measuring particle size distribution by laser diffraction scattering. The average particle diameter of polyethylene particles was examined by measuring D50 using a Coulter Multisizer II (manufactured by Coulter Electronics Co.), a device for measuring particle size distribution by volumetry.

The specific surface area was measured using a BET specific surface area measuring unit MICROMERITIX AQUISOBE Model 2100 (manufactured by Shimazu Corporation). The density (void volume) was measured using Autopicnometer Model 1320 (manufactured by Shimazu Corporation).

EXAMPLE 1

In a ball mill, 20 g of manganese dioxide (average particle diameter: 2.0 $\mu$m; specific surface area: 60 $m^2$/g), 25 g of cupric oxide (average particle diameter: 1.9 μm; specific surface area: 60 m²/g) and 55 g of activated carbon (particle diameter: 48 mesh(300 lm)-pass; specific surface area: 510 m²/g) were mixed. To the mixture obtained, 20 g of ultrahigh-molecular weight polyethylene particles (molecular weight as measured by viscometry: 2,000 K; particle diameters: 20 to 150 μm (average particle diameter: 35 μm)) were added, followed by further thorough mixing. A portion of the mixed particles obtained was moved into a frame of 100 mm×100 mm×2.0 mm (length×width× thickness), which was then held between mirror plates of 2.0 mm thick from the top and bottom, followed by treatment for 40 minutes at a molding temperature of 160° C. and a pressure of 1,960 kPa (20 kg/cm²) to obtain a 2.0 mm thick porous plate.

The porous plate obtained was cut out to a weight of 10 g, and then hung in a hermetically enclosed 2 liter container containing 200 ppm of ammonia, leaving it to stand. After 30 minutes, the ammonia concentration was measured to reveal that it had decreased to 5 ppm.

The porous plate obtained was cut out to a weight of 2.7 g, and then hung in a hermetically enclosed 1 liter polypropylene beaker containing 1,000 ppm of ammonia, leaving it to stand. After 20 minutes, its concentration was measured to reveal that it had decreased to as low as 130 ppm.

The porous plate obtained was cut out to a weight of 2.7 g, and then hung in a hermetically enclosed 1 liter polypropylene beaker containing 310 ppm of methyl mercaptan, leaving it to stand. After 20 minutes, its concentration was measured to reveal that it had decreased to as low as 29 ppm.

The porous plate obtained was further cut out to a weight of 2.7 g, and then hung in a hermetically enclosed 1 liter polypropylene beaker containing 340 ppm of trimethylamine, leaving it to stand. After 20 minutes, its concentration was measured to reveal that it was decreased to as low as 81 ppm. The concentration was measured using an indicator tube (manufactured by Gastech Co.)

EXAMPLE 2

In a ball mill, 50 g of manganese dioxide (average particle diameter: 2.0 μm), 50 g of cupric oxide (average particle diameter: 1.9 μm) and 160 g of activated carbon (particle diameter: 48 mesh(300 μm)-pass) were mixed. To the mixture obtained, 70 g of ultrahigh-molecular weight polyethylene particles (molecular weight as measured by viscometry: 2,000 K; particle diameters: 20 to 40 μm (average particle diameter: 30 μm)) were added, followed by further thorough mixing.

The mixed particles obtained were evenly spread over a square tray so as to be 10 mm thick or less, followed by heating at 150° C. for 40 minutes. The particles thus treated were cooled to room temperature, and thereafter crushed using a primary crusher to obtain a granular product with a size of about 3 to 10 mm.

This granular product (20 g) was put in a hermetically enclosed 2 liter container, and hydrogen sulfide gas was fed into the container in a concentration of 100 ppm. After 10 minutes, the concentration of hydrogen sulfide gas was measured using a hydrogen sulfide gas indicator tube. As a result, the concentration of hydrogen sulfide gas was zero.

EXAMPLE 3

In a ball mill, 50 g of manganese dioxide (average particle diameter: 2.0 μm), 50 g of cupric oxide (average particle diameter: 1.9 μm) and 160 g of activated carbon (particle diameter: 48 mesh(300 μm)-pass) were mixed. To the mixture obtained, 70 g of ultrahigh-molecular weight polyethylene particles (molecular weight as measured by viscometry: 2,000 K; particle diameters: 20 to 40 μm (average particle diameter: 30 μm)) were added, followed by further thorough mixing. The mixed particles obtained were put into a screw type granulator, followed by agitation and mixing at 150° C. for 25 minutes. A granular product with a size of about 2 to 5 mm was obtained.

This granular product (10 g) was put in a hermetically enclosed 2 liter container, and hydrogen sulfide gas was fed into the container in a concentration of 100 ppm. After 10 minutes, the concentration of hydrogen sulfide gas was measured using a hydrogen sulfide gas indicator tube. As a result, the concentration of hydrogen sulfide gas was zero.

EXAMPLE 4

In a ball mill, 20 g of manganese dioxide (average particle diameter: 2.0 μm), 25 g of cupric oxide (average particle diameter: 1.9 μm) and 55 g of activated carbon (particle diameter: 48 mesh(300 μm)-pass) were mixed.

One liter of water was put into a 2 liter container, and 2 g of a water-absorptive resin SUMICAGEL (trade name of a vinyl acetate-acrylate copolymer saponified product; available from Sumitomo Chemical Co., Ltd.) was added thereto, followed by thorough stirring. Thereafter, the whole of the above mixed particles and 20 g of ultrahigh-molecular weight polyethylene particles (molecular weight as measured by viscometry: 2,000 K; particle diameters: 20 to 150 μm (average particle diameter: 35 μm))were added, followed by further thorough mixing. Thus, a particle suspension was prepared.

A nonwoven glass fabric of 0.3 mm thick (40 g/m²) was coated and impregnated with this particle suspension by dip coating, followed by heating and drying at 175° C. to obtain a sheet-form product. This sheet-form product has a specific surface area of 33 m²/g and a void volume of 91%.

The resulting sheet-form product (10 g) was put in a hermetically enclosed 2 liter container containing ammonia gas in a concentration of 200 ppm. After 20 minutes, the concentration of ammonia gas was measured to reveal that it was 5 ppm or less.

EXAMPLE 5

In a ball mill, 50 g of manganese dioxide (average particle diameter: 2.0 μm), 50 g of cupric oxide (average particle diameter: 1.9 μm) and 160 g of activated carbon (particle diameter: 100 mesh(150 μm)-pass) were mixed, and 70 g of ultrahigh-molecular weight polyethylene particles (particle diameters: 20 to 40 μm (average particle diameter: 30 μm)) were added thereto, followed by further thorough mixing.

Separately, 2 liter of water was put into a 3 liter polyethylene container, and the particle mixture previously obtained by mixing in the ball mill was added thereto little by little while stirring. Subsequently, 3 g of SUMICAGEL (available from Sumitomo Chemical Co., Ltd.) (viscosity: 150 cp) was added thereto, followed by thorough mixing to obtain a homogeneously dispersed suspension.

This suspension thus obtained was coated on a nonwoven glass fabric of 35 g/m² (thickness: about 0.2 mm) by dip coating using a vertical coater, followed by heating and drying. The coating was carried out at a rate of 1 m/min, and the heating and drying at a temperature of 170° C. The sheet-form product thus obtained was a nonwoven glass fabric in which 50% by weight per unit area was held by the substrate and the remaining 50% by weight was held by the activated carbon particles, manganese and copper oxides particles and ultrahigh-molecular weight polyethylene particles.

The sheet-form product obtained was cut in a size of 100 mm×100 mm, and put in a hermetically enclosed 2 liter container, and hydrogen sulfide gas was fed into the container in a concentration of 100 ppm. After 10 minutes, the concentration of hydrogen sulfide gas was measured using a hydrogen sulfide gas indicator tube. As a result, the concentration of hydrogen sulfide gas was zero.

EXAMPLE 6

The same particle suspension as the particle suspension obtained in the first half stage in Example 4 was coated on a nonwoven polyester fabric of 70 g/m$^2$ (thickness: about 0.2 mm) by gravure coating using a horizontal coater, followed by heating and drying. The coating was carried out at a rate of 1 m/min, and the heating and drying at a temperature of 160° C. The sheet-form product thus obtained was a nonwoven polyester fabric in which 45% by weight per unit area was held by the substrate nonwoven polyester fabric and the remaining 55% by weight was held by the respective particles of activated carbon, manganese oxide, copper oxide and ultrahigh-molecular weight polyethylene.

The sheet-form product obtained was cut to a size of 100 mm×100 mm, and put in a hermetically enclosed 2 liter container, and ammonia gas was fed into the container in a concentration of 100 ppm. After 30 minutes, the concentration of ammonia gas was measured using an ammonia gas indicator tube. As a result, the concentration of ammonia gas was zero.

EXAMPLE 7

The same particle suspension as the particle suspension obtained in the first half stage in Example 4 was coated on a nonwoven polyester-pulp mixed fabric of 30 g/m$^2$ (thickness: about 0.2 mm) by dye head coating using a horizontal coater, followed by heating and drying. The coating was carried out at a rate of 2 m/min, and the heating and drying at a temperature of 160° C. The sheet-form product thus obtained was a nonwoven polyester-pulp mixed fabric in which 45% by weight per unit area was held by the substrate nonwoven polyester-pulp mixed fabric and the remaining 55% by weight was held by the respective particles of activated carbon, manganese oxide, copper oxide and ultrahigh-molecular weight polyethylene.

The sheet-form product obtained was cut to a size of 100 mm×100 mm, and put in a hermetically enclosed 2 liter container, and ammonia gas was fed into the container in a concentration of 100 ppm. After 30 minutes, the concentration of ammonia gas was measured using an ammonia gas indicator tube. As a result, the concentration of ammonia gas was zero.

EXAMPLE 8

In a ball mill, 50 g of manganese dioxide (average particle diameter: 2.0 μm), 50 g of cupric oxide (average particle diameter: 1.9 μm), 50 g of magnesium oxide (average particle diameter: 1.5 μm) and 110 g of activated carbon (particle diameter: 48 mesh(300 μm)-pass) were mixed, and 70 g of ultrahigh-molecular weight polyethylene particles (particle diameters: 20 to 40 μm (average particle diameter: 30 μm))were added thereto, followed by further thorough mixing.

Separately, 2 liters of water was put into a 3 liter polyethylene container, and the particle mixture previously obtained by mixing in the ball mill was added little by little thereto while stirring. Subsequently, 3 g of SUMICAGEL (available from Sumitomo Chemical Co., Ltd.) was added thereto, followed by thorough mixing to obtain a homogeneously dispersed suspension.

This suspension thus obtained was coated on a nonwoven glass fabric of 35 g/m$^2$ (thickness: about 0.2 mm) by dip coating using a vertical coater, followed by heating and drying. The coating was carried out at a rate of 1 m/min, and the heating and drying at a temperature of 170° C. The sheet-form product thus obtained was a nonwoven glass fabric in which 50% by weight per unit area was held by the substrate of nonwoven glass fabric and the remaining 50% by weight was held by the activated carbon, manganese, copper and manganese oxides particles and ultrahigh-molecular weight polyethylene particles.

The sheet-form product obtained was cut to a size of 100 mm×100 mm, and put in a hermetically enclosed 2 liter container, and hydrogen sulfide gas was fed into the container in a concentration of 100 ppm. After 10 minutes, the concentration of hydrogen sulfide gas was measured using a hydrogen sulfide gas indicator tube. As a result, the concentration of hydrogen sulfide gas was zero.

EXAMPLE 9

Five sheets of the sheet-form product obtained in Example 4 were superposed one another, and then held between two mirror plates, followed by treatment at a temperature of 170° C. and a pressure of 1,470 kPa (15 kg/cm$^2$) for 60 minutes. Thus a multi-layer sheet-form product was obtained, which was denser than the sheet-form product of Example 4.

The resulting sheet-form product (10 g) was put in a hermetically enclosed 2 liter container containing ammonia gas in a concentration of 200 ppm. After 30 minutes, the concentration of ammonia gas was measured to reveal that it was 5 ppm or less.

Example 10

One sheet of the sheet-form product obtained in Example 5 and one sheet of the sheet-form product obtained in Example 8 were superposed on each other, and then held between two mirror plates, followed by treatment at a temperature of 160° C. and a pressure of 1,960 kPa (20 kg/cm$^2$) for 30 minutes.

The double-layer sheet-form product obtained was cut to a size of 100 mm×100 mm, and put in a hermetically enclosed 2 liter container, and hydrogen sulfide gas was fed into the container in a concentration of 100 ppm. After 5 minutes, the concentration of hydrogen sulfide gas was measured to reveal that it was zero.

The double-layer sheet-form product obtained was also cut to a size of 100 mm×100 mm, and put in a hermetically enclosed 2 liter container, and acetic acid was fed into the container in a concentration of 150 ppm. After 20 minutes, the concentration of acetic acid was measured to reveal that it was 10 ppm or less.

EXAMPLE 11

One liter of water was put in a 2 liter container, and 1 g of a water-absorptive resin SUMICAGEL (trade name of a vinyl acetate-acrylate copolymer saponified product; available from Sumitomo Chemical Co., Ltd.) was added thereto, followed by thorough stirring. Thereafter, 20 g of manganese dioxide (average particle diameter: 2.0 μm), 25 g of cupric oxide (average particle diameter: 1.9 μm) and 55 g of activated carbon (particle diameter: 100 mesh(150 μm)-pass) were put in a ball mill, and mixed for a stated time. Then, 20 g of ultrahigh-molecular weight polyethylene particles (particle diameters: 20 to 150 μm; average particle diameter: 35 μm) was added thereto, followed by further mixing, to obtain a particle suspension. This suspension was coated on a nonwoven glass fabric of 30 g/m$^2$ so as for the particles to be in a total weight of 37 g/m$^2$ (coating weight of the particles was 55% by weight of the whole sheet-form product) followed by drying at 160° C. to obtain a sheet-form product.

Figure 1:
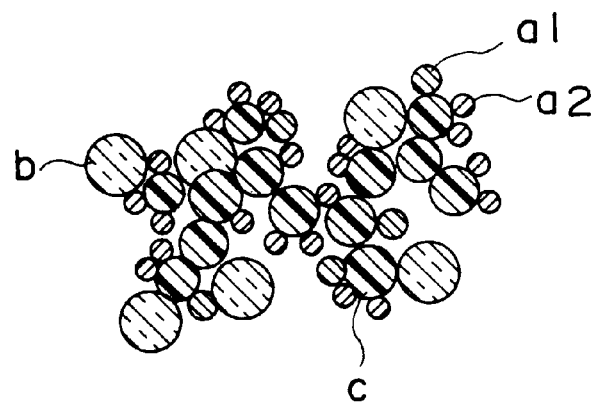
FIG. 1 is a diagrammatic view showing how metal and/or metal oxide particles (a1, a2), adsorbent particles (b) and thermoplastic resin particles (c) stand bound or joined in the environment purifying material of the present invention.
Figure 2:
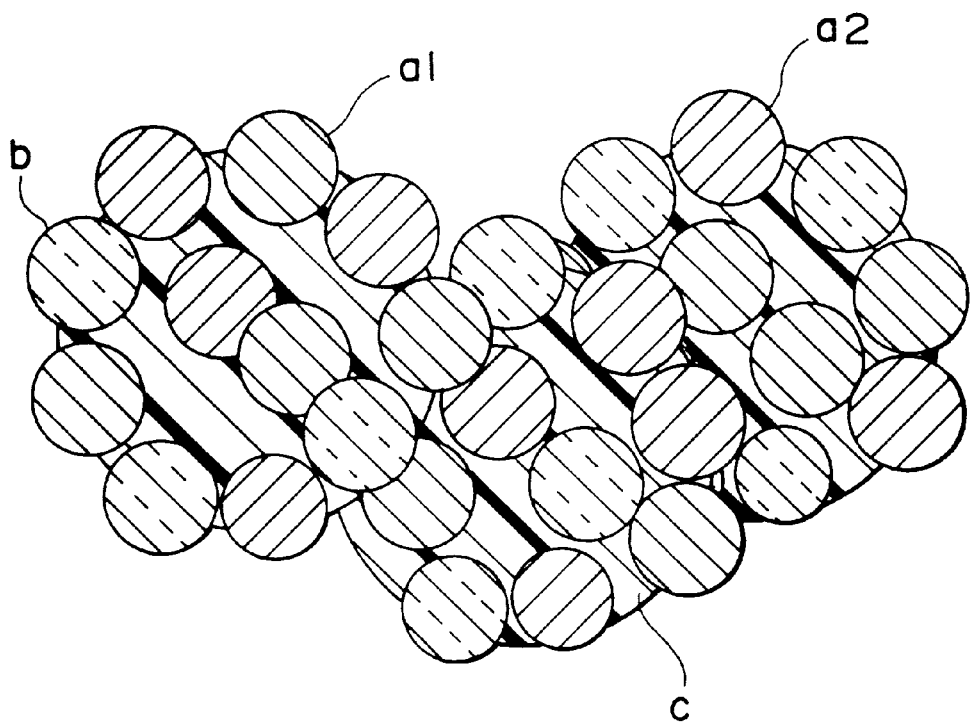
FIG. 2 is diagrammatic view of another example of the environment purifying material of the present invention, and is an enlarged view of the metal and/or metal oxide particles (a1, a2), the adsorbent particles (b) and the thermoplastic resin particles (c).
Figure 3:
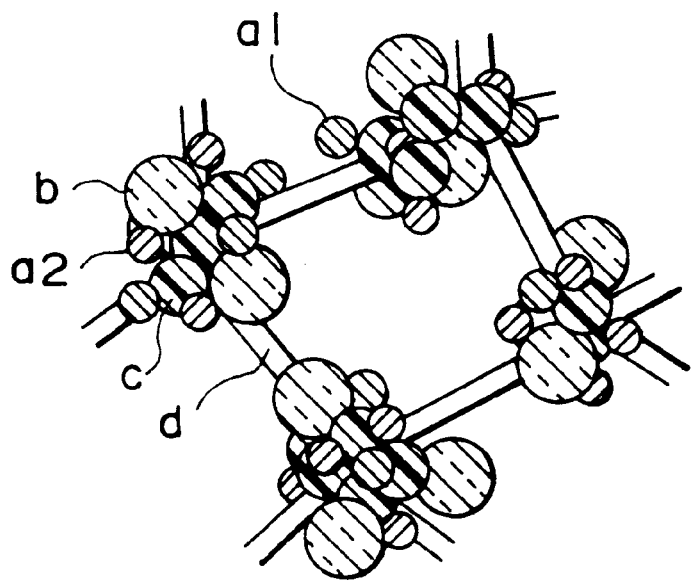
FIG. 3 is a diagrammatic view showing how metal and/or metal oxide particles (a1, a2), adsorbent particles (b), thermoplastic resin particles (c) and a fibrous substrate (d) stand bound or joined in the sheet-form environment purifying material of the present invention.
Figure 4:
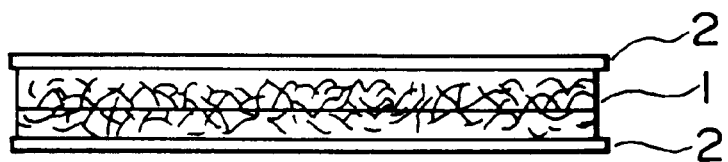
FIG. 4 is a diagrammatic view showing a cross section of a sheet-form environment purifying material covered with fine-weave sheets on both sides thereof. Reference numeral 1 denotes the two sheets of the sheet-like products superposed, and reference numeral 2 denotes the nonwoven glass fabric.

Next, both on the top and bottom sides of this sheet-form product, sheets of 65 μm thick nonwoven glass fabric (30 g/m$^2$) were superposed, which were then held between two mirror plates, followed by heating and pressing at a temperature of 170° C. and a pressure of 1,960 kPa (20 kg/cm$^2$) for 30 minutes to obtain a laminated integral product as shown in FIG. 4. In FIG. 4, reference numeral 1 denotes the two sheets of the sheet-like products superposed, and 2, the nonwoven glass fabric.

The laminated integral sheet-like product was cut to a size of 100 mm×150 mm, and put in a hermetically enclosed 2 liter container containing ammonia gas in a concentration of 200 ppm. After 30 minutes, the concentration of ammonia gas was measured to reveal that it was 5 ppm or less.

EXAMPLE 12

Two sheets of the sheet-form product obtained in the first half stage in Example 11 were superposed on each other, and the subsequent procedure was repeated in the same manner as in Example 11 to produce a laminated integral sheet-form product with surface protective materials.

This laminated integral sheet-form product was cut to a size of 100 mm×150 mm, and put in a hermetically enclosed 2 liter container containing ammonia gas in a concentration of 200 ppm. After 15 minutes, the concentration of ammonia gas was measured to reveal that it was 10 ppm or less.

EXAMPLE 13

In a ball mill, 50 g of manganese dioxide (average particle diameter: 2.0 μm), 50 g of cupric oxide (average particle diameter: 1.9 μm) and 160 g of activated carbon (particle diameter: 48 mesh(300 μm)-pass) were mixed, and 70 g of ultrahigh-molecular weight polyethylene particles (particle diameters: 20 to 40 μm; average particle diameter: 30 μm) were added thereto, followed by further thorough mixing to obtain mixed particles. Two liters of water was put into a 3 liter container, and the mixed particles were added thereto little by little while stirring. Subsequently, 3 g of a water-absorptive resin SUMICAGEL was added thereto, followed by thorough mixing to form a homogeneously dispersed particle suspension.

This suspension was coated on a glass nonwoven fabric of 35 g/m$^2$ by dip coating using a vertical coater, followed by drying to obtain a first sheet-form product. The coating was carried out at a rate of 1 m/min, and the drying at a temperature of 170° C. The coating weight of the particles was controlled to be 35 g/m$^2$ (coating weight of the particles was 50% by weight of the whole sheet-like product).

Separately, 260 g of activated carbon (particle diameter: 48 mesh(300 μm)-pass) and 85 g of ultrahigh-molecular weight polyethylene particles (particle diameters: 20 to 40 μm; average particle diameter: 30 μm) were mixed in a ball mill to obtain mixed particles. Two liters of water was put into a 3 liter container, and the mixed particles were added thereto little by little while stirring. Subsequently, 3 g of a water-absorptive resin SUMICAGEL was added thereto, followed by thorough mixing to form a homogeneously dispersed particle suspension. Like the above, this suspension was coated on a glass nonwoven fabric of 35 g/m$^2$ by dip coating using a vertical coater, followed by drying to obtain a second sheet-form product.

On the top and bottom sides of the first sheet-form product, sheets of the second sheet-form product were superposed to form a three-layer structure. Then, on the top and bottom sides thereof, sheets of nonwoven rayon fabric of 40 g/m$^2$ were superposed, which were then held between two mirror plates, followed by heating and pressing at a temperature of 160° C. and a pressure of 1,960 kPa (20 kg/cm$^2$) for 30 minutes to obtain a laminated integral product.

The laminated integral sheet-form product provided with surface protective materials was cut to a size of 100 mm×100 mm, and put in a hermetically enclosed 2 liter container. Hydrogen sulfide gas was fed into the container in a concentration of 100 ppm. After 5 minutes, the concentration of hydrogen sulfide gas was measured using a hydrogen sulfide gas indicator tube. As a result, the concentration of hydrogen sulfide gas was zero.

We claim:

1. An environment purifying material comprising:
   (a) particles consisting essentially of at least one being selected from the group consisting of manganese, copper, zinc, iron, vanadium, nickel, titanium, palladium, platinum, manganese oxide, copper oxide, zinc oxide, iron oxide, vanadium oxide, nickel oxide, titanium oxide, palladium oxide, and platinum oxide;
   (b) adsorbent particles consisting essentially of at least one selected from the group consisting of activated carbon, silica gel and sepiolite; and
   (c) thermoplastic resin particles;
   wherein said component-(a) particles and said component-(b) particles are respectively bound to said component-(c) particles, and said component-(c) particles are joined to each other.

2. The environment purifying material according to claim 1, wherein;
   said component-(c) particles are selected from the group consisting of ultrahigh-molecular weight polyethylene, polyethylene, polycarbonate, polyamide acrylonitrile-butadiene-styrene resins, polyimide, polyvinyl chloride, cellulose acetate, polysulfone, polystyrene phthalate and polypropylene.

3. The environment purifying material according to claim 2, wherein;
   said component-(a) particles are manganese dioxide and cupric oxide;
   said component-(b) particles are activated carbon; and
   said component-(c) particles are ultrahigh-molecular weight polyethylene having an average molecular weight of from 1,000,000 to 9,000,000 as measured by viscometry.

4. The environment purifying material according to claim 1, wherein;
   said component-(a) particles have an average particle diameter of from 0.1 μm to 10 μm;
   said component-(b) adsorbent particles contain particles that pass a sieve of 48 meshes (300 μm), in an amount not less than 50% by weight based on the total weight of the adsorbent particles; and said component-(c) particles have an average particle diameter of from 20 μm to 150 μm.

5. The environment purifying material according to claim 1, wherein said component-(c) particles are contained in an amount of from 10 to 80 parts by weight based on 100 parts total weight, the total weight being defined by the sum of from 90 parts by weight to 10 parts by weight of said component-(a) particles and from 10 parts by weight to 90 parts by weight of said component-(b) adsorbent particles.

6. The environment purifying material according to claim 1, wherein the environment purifying material is formed in any shape of grains, pellets, balls and a plate.

7. A process for producing the environment purifying material according to claim 1 comprising the steps of mixing;

(a) particles of metal and/or metal oxide;

(b) adsorbent particles; and (c) thermoplastic resin particles;

and heating the mixture at a temperature not lower than the melting point of the thermoplastic resin and not higher than the thermal decomposition temperature thereof.

8. A process for producing the environment purifying material according to claim 7, wherein said mixture is heated under application of pressure.

9. A method of purifying the environment for removing pollutive substances contained in polluted air or water by contacting the objects to be purified with said environment purifying materials according to either one of claims 1 and 2.

10. The environment purifying materials according to claim 1, further comprising particles (e) consisting essentially of magnesium oxide, wherein particles (a), (b) and (e) are respectively bound to particles (c), and particles (c) are joined to each other.

11. A sheet-form environment purifying material comprising;

(a) particles consisting essentially of at least one being selected from the group consisting of manganese, copper, zinc, iron, vanadium, nickel, titanium, palladium, platinum, manganese oxide, copper oxide, zinc oxide, iron oxide, vanadium oxide, nickel oxide, titanium oxide, palladium oxide, and platinum oxide;

(b) adsorbent particles consisting essentially of at least one selected from the group consisting of activated carbon, silica gel and sepiolite;

(c) thermoplastic resin particles; and (d) an air-permeable sheet of fibrous substrate;

wherein said component-(a) particles and said component-(b) particles are respectively bound to said component-(c) particles, and said component-(c) particles are joined to said component-(d) fibrous substrate.

12. The sheet-form environment purifying material according to claim 11, wherein:

said component-(c) particles are selected from the group consisting of ultrahigh-molecular weight polyethylene, polyethylene, polycarbonate, polyamide acrylonitrile-butadiene-styrene resins, polyimide, polyvinyl chloride, cellulose acetate, polysulfone, polystyrene phthalate and polypropylene; and said component-(d) fibrous substrate is a fibrous substrate having a void volume of from 60% to 98%.

13. The sheet-form environment purifying material according to claim 9, wherein;

said component-(a) particles are manganese dioxide and cupric oxide;

said component-(b) particles are activated carbon;

said component-(c) particles are ultrahigh-molecular weight polyethylene having an average molecular weight of from 1,000,000 to 9,000,000 as measured by viscometry; and said component-(d) fibrous substrate is a non-woven glass fabric having a void volume of from 60% to 98%.

14. The sheet-form environment purifying material according to claim 11, wherein;

said component-(a) particles have an average particle diameter of from 0.1 μm to 10 μm;

said component-(b) adsorbent particles contain particles that pass a sieve of 48 meshes (300 μm), in an amount not less than 50% by weight based on the total weight of the adsorbent particles; and said component-(c) particles have an average particle diameter of from 20 μm to 150 μm.

15. The sheet-form environment purifying material according to claim 11, wherein mixed particles of said components-(a) to (c) are in a weight of (a)+(b)+(c), of from 40 to 200 parts by weight based on 100 parts by weight of said component-(d) an air-permeable sheet fibrous substrate.

16. A multi-layer sheet-form environment purifying material comprising a plurality of environment purifying materials according to claim 11 which are superposed in layers.

17. The multi-layer sheet-form environment purifying material according to claim 16, wherein at least two layers thereof respectively contain the component-(a) particles or component-(b) adsorbent particles of different types.

18. A sheet-form environment purifying material comprising a sheet consisting of an environment purifying material according to claim 9, and an air-permeable surface protector covering at least one surface of said sheet.

19. A honeycomb type environment purifying material comprising said sheet-form environment purifying material according to claim 11, having been formed in a honeycomb shape.

20. The environment purifying materials according to claim 11, further comprising particles (e) consisting essentially of magnesium oxide, wherein particles (a), (b) and (e) are respectively bound to particles (c), and particles (c) are joined to the fibrous substrate (d).

* * * * *